US011251883B2

(12) United States Patent
Abramovitz et al.

(10) Patent No.: US 11,251,883 B2
(45) Date of Patent: Feb. 15, 2022

(54) DEVICE AND METHOD FOR DETERMINATION OF WHETHER A FRAME IS A MANAGEMENT FRAME OR A DATA FRAME

(71) Applicant: AIRTIES BELGIUM SPRL, Woluwe-saint-Lambert (BE)

(72) Inventors: Assi Abramovitz, Netanya (IL); Roie Rachamim, Netanya (IL)

(73) Assignee: AIRTIES BELGIUM SPRL, Woluwe-Saint-Lambert (BE)

( * ) Notice: Subject to any disclaimer, the term of this patent is extended or adjusted under 35 U.S.C. 154(b) by 15 days.

(21) Appl. No.: 16/771,955

(22) PCT Filed: Dec. 11, 2017

(86) PCT No.: PCT/IL2017/051337
§ 371 (c)(1),
(2) Date: Jun. 11, 2020

(87) PCT Pub. No.: WO2019/116360
PCT Pub. Date: Jun. 20, 2019

(65) Prior Publication Data
US 2021/0175982 A1    Jun. 10, 2021

(51) Int. Cl.
*H04B 17/327* (2015.01)
*H04B 17/18* (2015.01)
*H04B 17/17* (2015.01)
*H04B 17/382* (2015.01)

(52) U.S. Cl.
CPC ............ *H04B 17/18* (2015.01); *H04B 17/17* (2015.01); *H04B 17/327* (2015.01); *H04B 17/382* (2015.01)

(58) Field of Classification Search
None
See application file for complete search history.

(56) References Cited

FOREIGN PATENT DOCUMENTS

WO    2003/025597    3/2003

OTHER PUBLICATIONS

Airheads Community, "What is the relationship between data rate, SNR, and RSSI?" (Jun. 2, 2014) available at https://community.arubanetworks.com/t5/Controller-Based-WLANs/What-is-the-relationship-between-data-rate-SNR-and-RSSI/ta-p/178312.
Alimian et al., "Analysis of Roaming Techniques," IEEE 802.11-04/0377r0 (Mar. 2004).

(Continued)

*Primary Examiner* — James P Duffy
(74) *Attorney, Agent, or Firm* — Volpe Koenig

(57) ABSTRACT

A device comprising at least one hardware processor obtains a bandwidth for a communication from a station in a wireless network and a signal strength for the communication from the station, and determines that the communication is a communication related to network maintenance in case the bandwidth is below a first value and an expected bandwidth based on the signal strength is above a second value, and that the communication is a data communication in case the bandwidth is below the first value and the signal strength is below the second value, in case the communication is a data communication, the at least one hardware processor can determine that the station is active.

13 Claims, 3 Drawing Sheets

(56) References Cited

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

DEVICE AND METHOD FOR DETERMINATION OF WHETHER A FRAME IS A MANAGEMENT FRAME OR A DATA FRAME

TECHNICAL FIELD

The present disclosure relates generally to wireless networks and in particular to determination of whether a frame in wireless networks with multiple Access Points (APs) is a data frame or a management frame.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

FIG. 1 illustrates an exemplary conventional wireless local area network (WLAN) 100 with a plurality of wireless Access Points (APs) 110, 120 and a mobile station 130. The WLAN can for example be a Wi-Fi network compatible with IEEE 802.11, a Bluetooth® network or a cellular network. The mobile station 130 can for example be a personal computer, a mobile phone (smartphone) or a tablet.

In such a network, each AP advantageously operates using a channel, i.e. frequencies, distinct from the channel of other network APs in order to avoid interference, the mobile station 130 generally being wirelessly connected to a single AP, such as for example AP2 120. As is well known, there may be situations in which it could be preferable to hand over the mobile station to another AP, in this example AP1. Reasons for handing over the mobile station include: load balancing between APs, signal strength problems owing to for instance movement of the mobile station.

Within the network 100, handover (also called 'roaming') can be managed by a WLAN controller 140, which as illustrated may be a standalone device, but which also may be implemented on one of the APs 110, 120. The WLAN controller 140 and the APs are generally connected in a wired or wireless network 150 illustrated by solid line in FIG. 1.

In order to manage handover, the WLAN controller 140 needs to know to which APs, a specific mobile station can be handed over. In the exemplary system in FIG. 1, where there is a single alternative AP, the WLAN controller 140 needs to know if the mobile station can be handed over to the 'other' AP.

One of the parameters used by handover algorithms is whether a station is active, i.e. if the frames communicated with the station are data frames (e.g. used in streaming), as opposed to passive, i.e. if the frames are management frames used to establish and maintain connections.

A typical WLAN driver, typically implemented in an AP, collects statistics about radios (i.e. the physical radio frequency interfaces of the APs) and stations and reports them to the WLAN controller. The extent and granularity of the statistics are never perfect, leaving the WLAN controller with gaps to fill. For example, one of the basic bits of information that is commonly reported by the WLAN driver is the transmission (TX) and reception (RX) PHY (Physical layer) rates. PHY rate information is usually maintained per station, as well as per direction (TX/RX). However, typically only a single representative value is maintained over a sample period, that for example can be 1 second. For each direction, the WLAN driver thus has to summarize a potentially large number of transmitted or received frames into a single PHY rate value. One way of doing this is by taking an average over all the frames. A more common solution is to use the values of the last frame as the representative value for the entire sample period.

As is well known, the last frame may either be a data frame or a management frame, but the indication of the type of frame the last frame was, is typically not provided by the WLAN driver.

The PHY rate of management frames comparatively is very low; for example for 802.11N it can be 1 mbps for management frames and 130 mbps for data frames, while the numbers can be 6 mbps and 866 mbps for 802.11ac. Considering this, distinguishing between data frames (i.e. from an active station) and management frames can be done by filtering samples with PHY rate below a certain threshold. A disadvantage of this method is that it at least in certain cases can provide false conclusion.

It will therefore be appreciated that it is desired to have a solution that overcomes at least part of the conventional problems determining whether a frame is a management frame or a data frame and hence if the station is passive or active. The present principles provide such a solution.

SUMMARY OF DISCLOSURE

In a first aspect, the present principles are directed to a method in a device in a wireless network. The device obtains a bandwidth and a signal strength for a communication from a station, and determines that the communication is a communication related to network maintenance in case the bandwidth is below a first value and an expected bandwidth based on the signal strength is above a second value, and that the communication is a data communication in case the bandwidth is below the first value and the expected bandwidth based on the signal strength is below the second value.

Various embodiments of the first aspect include:
That the method further comprises determining that the communication is a data communication in case the bandwidth is above the first value.
That obtaining the bandwidth and the signal strength comprises receiving the bandwidth and the signal strength from a second device receiving the communication in the network.
That obtaining the bandwidth and the signal strength comprises measuring the bandwidth and the signal strength.
That the expected bandwidth is obtained by converting the signal strength to the expected bandwidth and deducting a margin.
That the method further comprises determining that the station is active in case the communication is determined to be a data communication and that the station is inactive in case the communication is related to network maintenance.

In a second aspect, the present principles are directed to a device comprising at least one hardware processor configured to obtain a bandwidth and a signal strength for a communication from a station in a wireless network, and determine that the communication is a communication related to network maintenance in case the bandwidth is below a first value and an expected bandwidth based on the signal strength is above a second value, and that the communication is a data communication in case the bandwidth is below the first value and the expected bandwidth based on the signal strength is below the second value.

Various embodiments of the second aspect include:

That the at least one hardware processor is further configured to determine that the communication is a data communication in case the bandwidth is above the first value.

That the device further comprises at least one interface configured to receive the bandwidth and the signal strength from a second device receiving the communication in the network.

That the expected bandwidth is obtained by converting the signal strength to the expected bandwidth and deducting a margin.

That the expected bandwidth is obtained by converting the signal strength minus a margin to the expected bandwidth.

That the at least one hardware processor is further configured to determine that the station is active in case the communication is determined to be a data communication and that the station is inactive in case the communication is related to network maintenance. The at least one hardware processor can further determine that the station is active in upon a given number of determinations that the communication is a data communication in a time window.

In a third aspect, the present principles are directed to a computer program comprising program code instructions executable by a processor for implementing the steps of a method according to any embodiment of the first aspect.

In a fourth aspect, the present principles are directed to a computer program product which is stored on a non-transitory computer readable medium and comprises program code instructions executable by a processor for implementing the steps of a method according to any embodiment of the first aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
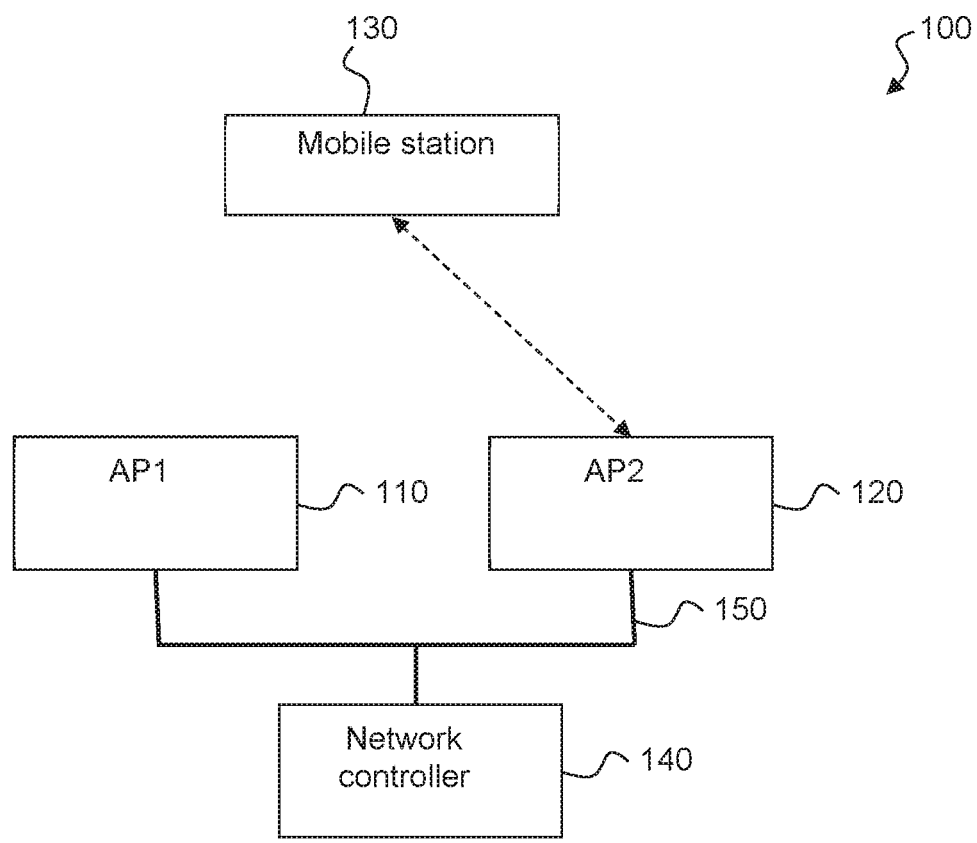
FIG. 1 illustrates a conventional Wi-Fi network.
Figure 2:
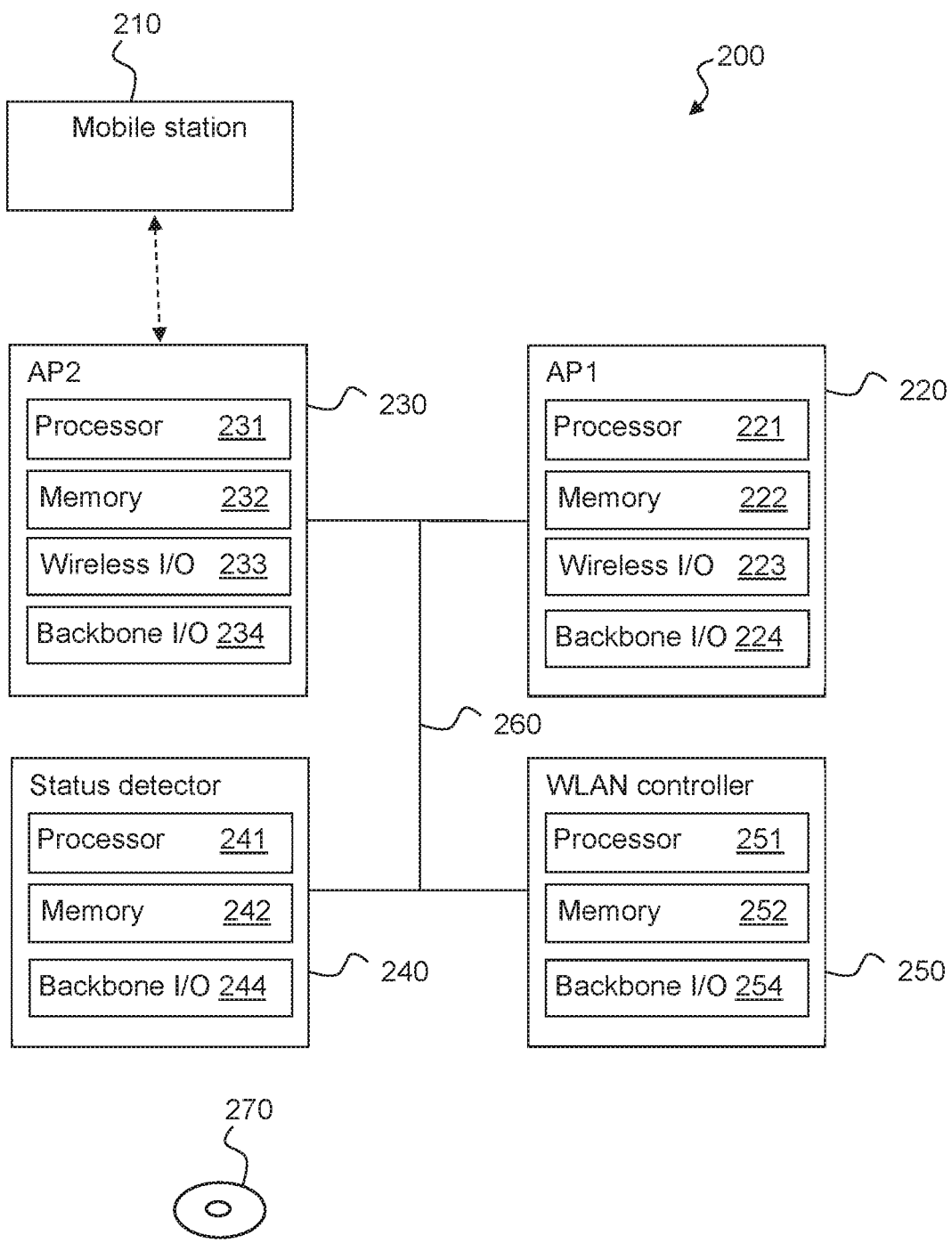
FIG. 2 illustrates an exemplary system according to an embodiment of the present principles.

FIG. 2 illustrates an exemplary system 200 according to an embodiment of the present principles. The system 200 includes a mobile station (STA) 210, a first access point (AP1) 220 and a second access point (AP2) 230 such as a gateway. The two access points 220, 230 are configured for wireless communication with mobile stations, e.g. using Wi-Fi according to IEEE 802.11. The system 200 further includes a status detector device 240, configured to determine whether a frame is a management frame or a data frame and hence whether a station is inactive or active, and a wireless LAN (WLAN) controller 250. The APs, the status detector device 240 and the WLAN controller 250 are connected by a connection 260, which preferably is wired but also can be wireless.

The mobile station 210 can be any kind of conventional device—mobile phone, tablet, sensor, etc.—compatible with the wireless communications standard used by the APs.

Each AP 220, 230 includes at least one hardware processing unit ("processor") 221, 231, memory 222, 232 and at least one wireless communications interface 223, 233, in the example a Wi-Fi interface, configured to communicate with other mobile stations, and a backbone interface 224, 234 configured for communication with the other devices connected to the connection 260. Any suitable communication standard, such as Wi-Fi (IEEE 802.11), Ethernet (IEEE 802.3), and PLC (power-line communication), could be used for the communication over the connection 260.

The APs 220, 230 are configured to operate on different channels, i.e. different frequencies, so as to avoid interference. The channel allocation, which preferably is dynamic, can be performed in any suitable conventional way.

The status detector device 240 and the WLAN controller 250 each include at least one hardware processing unit ("processor") 241, 251, memory 242, 252 and a backbone interface 244, 254 configured for communication with the other devices connected to the connection 260. In particular, the backbone interface 244 of the status detector device 240 is configured to receive measurements of transmission rate (PHY rate or other measure of bandwidth) and signal strength (RSSI) from the APs, as will be further described hereinafter. The status detector device 240 and the WLAN controller 250 can be stand-alone devices or be implemented on another device in the system 200, such as on an AP, or in an external network, or in the Cloud.

The system could also include a gateway device (not shown) configured to connect the system 200 to an external network such as the Internet. The gateway device can be a stand-alone device, but it can also be implemented on one of the devices connected to the connection 260, for example an AP.

The memories 222, 232, 242, 252, which can be implemented as a plurality of memory circuits possibly of different types, are configured to store software instructions for execution by the respective processors 221, 231, 241, 251, and also for various data necessary for performing the respective functions described herein.

The skilled person will appreciate that the illustrated devices are very simplified for reasons of clarity and that real devices in addition would include features such as internal connections and power supplies. Non-transitory storage media 270 stores instructions that, when executed by processor 241, perform the functions of the status detector device 240 as further described hereinafter with reference to FIG. 3.

A salient point of the present principles is the use of signal strength information, typically Received Signal Strength Indicator (RSSI) information in addition to the PHY rate to classify (802.11) frames.

Thus, instead of directly classifying a frame with a low PHY rate (i.e. below a given transmission rate threshold value) as a management frame, the status detector device 240 checks the corresponding RSSI value. In case this RSSI sample is low (i.e. below a signal strength threshold), then it is likely that the station was simply relatively far from the AP, which means that the frame can be classified as a data frame (sent at a low transmission rate, since the low signal strength did not permit a (significantly) higher transmission rate). On the other hand, in case the RSSI sample is high (i.e. above the signal strength threshold), then it is likely that the station was relatively close to the AP and that the frame was sent with a deliberately low transmission rate—as management frames are—and that the frame thus can be classified as a management frame.

The transmission rate threshold can be set as a fixed value, as in the conventional solution, for example to a maximum management frame transmission rate. The signal strength threshold can be set as a fixed value or, advantageously, as a value dependent on the transmission rate.

Alternatively, the received signal strength can be converted into an expected transmission rate, i.e. a transmission rate that the station could use to transmit data rates (rather than management frames that on purpose are sent using a low transmission rate), and compared with the measured PHY. If the expected transmission rate is at least a certain amount—this amount can be a fixed value dependent on system characteristics—then the frame can be classified as a management frame. For example, the following table [downloaded from http://community.arubanetworks.com/t5/Controller-Based-WLANs/What-is-the-relationship-between-data-rate-SNR-and-RSSI/ta-p/178312] applies to a specific 1×1 configuration in a 802.11n network:

| Rate (Mb/s)       | 6   | 9   | 12  | 18  | 24  | 36  | 48  | 54  |
|-------------------|-----|-----|-----|-----|-----|-----|-----|-----|
| SNR (db)          | 4   | 5   | 7   | 9   | 12  | 16  | 20  | 21  |
| Signal level (dBm)| −81 | −80 | −78 | −76 | −73 | −69 | −65 | −64 |

Similar tables can be obtained for other configurations, as is known in the art.

It should be noted that the PHY rate can further depend on factors unrelated to the RSSI, such as interference. In a variant, the interference is measured using any conventional method and the expected transmission rate is adjusted depending on the level of interference.

The present system can thus use a mechanism that contains both a hard coded—measured—mapping between RSSI and PHY rates for different configurations, and a dynamic mechanism that adjusts the function in case of for example interference.

Figure 3:
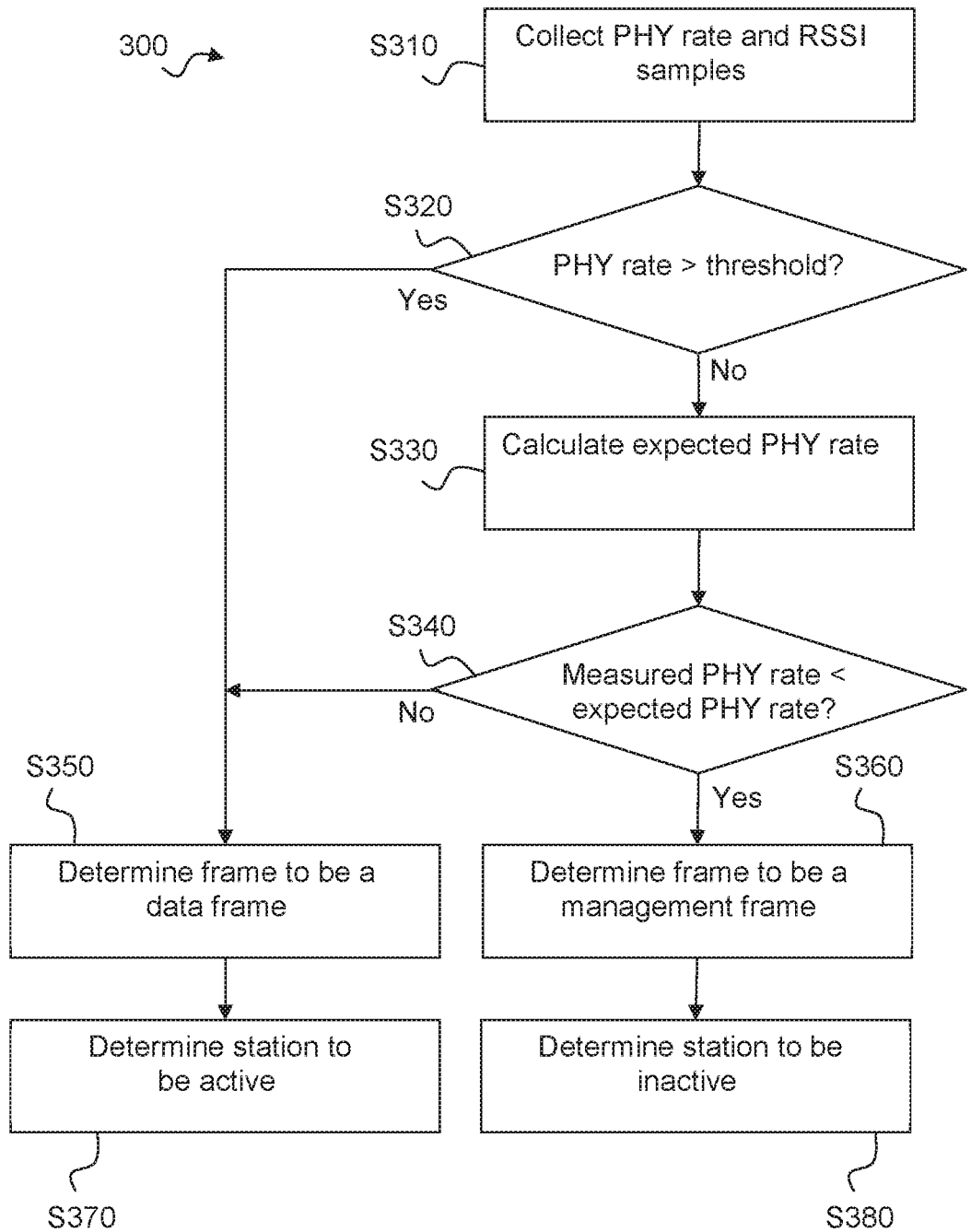
FIG. 3 illustrates an exemplary method for according to an embodiment of the present principles.

FIG. 3 illustrates a flow chart for a method 300 of frame classification at a status detector device 240 according to an embodiment of the present principles.

In step S310, the processor 241 of the status detector device 240 obtains the samples of PHY rate and RSSI from the APs 220, 230, which measured the received PHY rate and RSSI for their communications with the mobile stations 210 and provide this to the status detector device 240.

For each frame, the processor then performs the following steps, which may be performed in parallel or in series.

In step S320, the processor 241 filters the sample to keep the one with a PHY rate that is below a maximum management frame PHY rate, for example, 1 Mbps in 802.11n in the 2.4 GHz band. In case the PHY rate is above the maximum management frame PHY rate, then the frame is a data frame and the station is determined, in step S350, to be active.

In step S330, the processor 241 uses a function to calculate the expected PHY rate for the corresponding RSSI. As mentioned hereinbefore, further factors, like interference, may be taken into account as well.

In step S340, the processor 241 determines if the measured PHY rate is lower than the expected PHY rate minus a margin, preferably given in mbps or percent.

It will be appreciated that it is also possible to deduct the margin, which for example can be 3 dbm, from the RSSI value before it is input to the function to obtain the expected PHY rate. In this case, the measured PHY rate is compared directly with the expected PHY rate.

Based on the determination in step S340, the processor 241 determines whether the frame is a management frame or a data frame. In case the measured PHY rate is lower (than the expected PHY rate minus the margin or the expected PHY rate (including the margin), depending on the implementation), the frame is determined, in step S360, to be a management frame; otherwise the frame is determined, in step S350, to be a data frame.

In case it was determined in step S350 that the frame was a data frame, it can be determined, in optional step S370, that the station is active. Conversely, in case it was determined in step S360 that the frame was a management frame, it can be determined, in step S380, that the station is inactive.

In order to obtain a higher confidence level of the determination, for example 'active' or 'passive', more than a single sample can be used for the determination. In this case, the processor 241 is configured to determine the nature of a plurality of frames—management frame or data frame—during a given time period (such as a sliding window) and determine that the station is active if at least a given number or a given ratio are data frames.

As will be appreciated, the present principles can determine, without inspection of the content of a frame, whether the frame is a management frame or a data frame and hence if a station is inactive or active.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A method implemented by a device in a wireless network, the method comprising:
   obtaining a transmission rate for a communication from a station;
   obtaining a signal strength for the communication from the station;
   calculating an expected transmission rate based on the signal strength;
   determining by at least one hardware processor that the communication is a network maintenance related communication on a condition that the transmission rate is below a first value and the expected transmission rate is above a second value; and
   determining by the at least one hardware processor that the communication is a data communication on a condition that the transmission rate is below the first value and the expected transmission rate is below the second value.

2. The method of claim 1, further comprising determining that the communication is a data communication that the transmission rate is above the first value.

3. The method of claim 1, wherein the obtaining the transmission rate and the signal strength comprises receiving the transmission rate and the signal strength from a second device receiving the communication in the network.

4. The method of claim 1, wherein the obtaining the transmission rate and the signal strength comprises measuring the transmission rate and the signal strength.

5. The method of claim 1, wherein the expected transmission rate is determined by using a table to convert the signal strength to the expected transmission rate and deducting a margin.

6. The method of claim 1, further comprising determining by the at least one hardware processor that the station is active when the communication is determined to be the data communication and that the station is inactive when the communication is determined to be the network maintenance related communication.

7. A device comprising at least one hardware processor configured to:
   obtain a transmission rate for a communication from a station in a wireless network;
   obtain a signal strength for the communication from the station;
   calculate an expected transmission rate based on the signal strength;
   determine that the communication is a network maintenance related communication on a condition that the transmission rate is below a first value and the expected transmission rate is above a second value; and
   determine that the communication is a data communication on a condition that the transmission rate is below the first value and the expected transmission rate is below the second value.

8. The device of claim 7, wherein the at least one hardware processor is further configured to determine that the communication is a data communication on a condition that the transmission rate is above the first value.

9. The device of claim 7, further comprising at least one interface configured to receive the transmission rate and the signal strength from a second device receiving the communication in the network.

10. The device of claim 7, wherein the expected transmission rate is determined by using a table to convert the signal strength to the expected transmission rate and deducting a margin.

11. The device of claim 7, wherein the expected transmission rate is obtained by converting the signal strength using an algorithm.

12. The device of claim 7, wherein the at least one hardware processor is further configured to determine that the station is active when the communication is determined to be the data communication and that the station is inactive when the communication is determined to be the network maintenance related communication.

13. The device of claim 12, further comprising determining that the station is active upon completion of a given number of determinations that the communication is the data communication in a time window.

* * * * *